350-167

CROSS REFERENCE

SEARCH ROOM

350/229

X2565
X2682

Feb. 18, 1964 M. PLOKE 3,121,798

VARIABLE DIAPHRAGM STRUCTURE FOR PHOTOELECTRIC EXPOSURE METERS

Filed Jan. 23, 1961 3 Sheets-Sheet 1

VARIABLE DIAPHRAGM STRUCTURE FOR PHOTOELECTRIC EXPOSURE METERS

Filed Jan. 23, 1961 3 Sheets-Sheet 3

United States Patent Office 3,121,798

Patented Feb. 18, 1964

3,121,798

VARIABLE DIAPHRAGM STRUCTURE FOR PHOTOELECTRIC EXPOSURE METERS

Martin Ploke, Preetz, Holstein, Germany, assignor to Zeiss Ikon Aktiengesellschaft, Stuttgart, Germany Filed Jan. 23, 1961, Ser. No. 84,393
Claims priority, application Germany Jan. 23, 1960
13 Claims. (Cl. 250—229)

The invention relates to a photoelectric exposure meter of the type in which for the purpose of considering exposure factors there are arranged light reducing means in front of the photosensitive layer.

The customary iris diaphragms used in photographic objectives for the purpose of reducing the light passing through the objectives cannot be used in all cases in connection with photoelectric exposure meters because it is difficult to illuminate the photoelectric receiver uniformly when working with large and small diaphragm apertures. A non-uniform illumination of the photoelectric receiver has, however, the result that the light reduction does no longer correspond to the geometric ratio of the diaphragm aperture areas so that in general those properties of the photosensitive receiver vary greatly which influence the measuring process and this is particularly the case when photo resistances are employed as photoelectric receivers.

It is an object of the present invention to employ Venetian blind structures as light reducing means in front of the photoelectric receiver. Venetian blind structures in which all of the louver slats are pivotally adjusted in the same direction have, however, the disadvantage that only those light rays reach the photosensitive layer which have a certain inclination with respect to the optical axis.

It is therefore another object of the invention to employ such a type of Venetian blind structures in front of the photosensitive receiver, in which the adjacent louver slats are adjustable in opposite directions. Such type of a Venetian blind structure does not have the mentioned disadvantages provided the angles of inclination of the slats are not too great. This type of Venetian blind structures may, however, be used only for a relatively small aperture range. If it is desired to use the same for the same aperture range as the customary iris diaphragm, then one would obtain for large aperture values such small distances between the louver slats that these distances could hardly be maintained during the manufacture. For photographic cameras having objectives of a larger aperture ratio such Venetian blind structures may be sufficient to be used as light reducing means for the respective exposure meter.

In order to employ such a Venetian blind structure also for a greater diaphragm range, the present invention has as a further object to employ two consecutively arranged Venetian blind structures, whereby both these Venetian blind structures are arranged in front of the photosensitive layer. Furthermore, the pivot axes of the slats of the Venetian blind structure are arranged in such a manner that they cross each other and preferably are arranged at right angles to one another.

In accordance with another object of the invention, the uniform illumination of the photosensitive receiver layer may be considerably improved in that a diffusion disc and/or a lens screen is arranged in front of the photosensitive receiver layer, namely between the latter and the Venetian blind structure. The diffusion disc may, for instance, consist of a frosted or grooved glass plate or plastic plate or of a glass or plastic plate coated with a dull layer. The lens screen is preferably composed of square lenses which are made in accordance with the light passage apertures presented by the Venetian blind structure. The elementary lenses are of such a size and are arranged in such a manner that the parallel light beam impinging upon the light sensitive surface is concentrated in a double number of focal lines as there are provided light passage apertures. The diffusion action of a combined lens screen and diffusion disc is preferably determined in such a manner that the central diffusion width corresponds to the distance between adjacent focal lines. This assures that also when the light rays are parallel, there will be obtained a uniform illumination of the photosensitive receiver surface.

As mentioned in the foregoing, the light reducing means arranged in front of the photoelectric exposure meter are used in customary manner also for the purpose of considering the exposure factors of a photographic camera. A photographic camera, of course, is provided among other things with a diaphragm associated with the photographic objective. Therefore, the light passage characteristic of the Venetian blind type structure of the exposure meter is proportioned to the light passage characteristic of the diaphragm of the objective. In addition to the measures mentioned in the foregoing concerning the adaptation of the diaphragm range, there may be provided a further compensation in that the slats of the Venetian blind structure are made of such a type of transparent material that the light passing through this material, when the Venetian blind structure is closed, corresponds to the smallest diaphragm aperture of an iris diaphragm which, for instance, is arranged in a photographic objective.

For certain types of use, for instance for the light responsive diaphragm control of a photographic camera, it may be advisable to combine the Venetian blind structure according to the present invention with an iris diaphragm. At least in connection with a frosted lens screen plate the undesirable non-uniform illumination of the photoelectric receiver area as produced by an iris diaphragm can be substantially avoided. The advantage connected with the additional employment of an iris diaphragm consists in this, that one of the two diaphragm types, namely the iris diaphragm or the Venetian blind structure, may be employed for an automatic control of the diaphragm of the photographic objective, while the other diaphragm may be employed for the introduction of additional exposure factors.

It is another object of the invention to provide the end faces of the louver slats of the Venetian blind structure in addition to the customary bearing pins with pins which are adapted to be rotated about the axes of the bearing pins and are entering into suitable bores of a slidable control bar so that the slats of the Venetian blind structure may be adjusted to the desired angular position. In order to prevent that the power moment for adjusting the slats does not disappear in any position of the slats, it is required in accordance with the invention that the connection line between the bearing pins and the pins for adjusting the slats in all their possible positions form an angle in the direction of the adjusting power, which angle is different from zero.

The invention will now be described in greater detail in connection with the accompanying drawing, in which.

Figure 1:
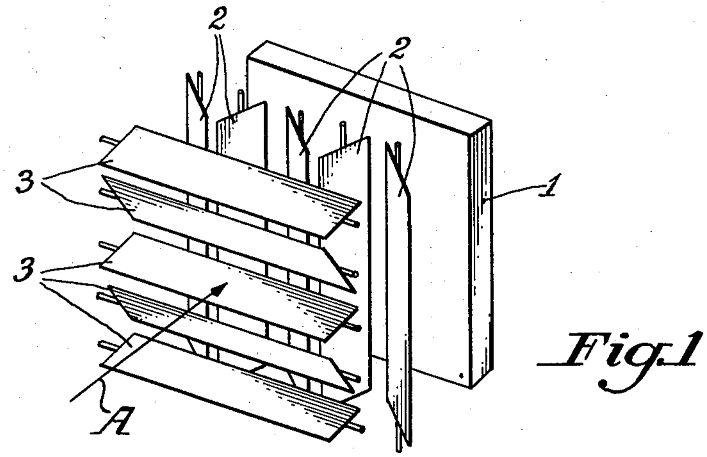
FIG. 1 illustrates diagrammatically a perspective view of a double Venetian blind structure arranged in front of a photoelectric receiver.

Referring to FIG. 1, two Venetian blind structures are arranged consecutively or one behind the other in front of a photoelectric receiver 1. One of the two Venetian blind structures is provided with vertically positioned slats 2 and the other with horizontally positioned slats 3. The arrow A indicates the direction of the light which passes through the two Venetian blind structures and impinges upon the photoelectric receiver 1. For the purpose of clarity the customary supporting frame for the slats 2 and 3 and the adjusting mechanisms for these slats have been omitted from FIG. 1.

Figure 2:
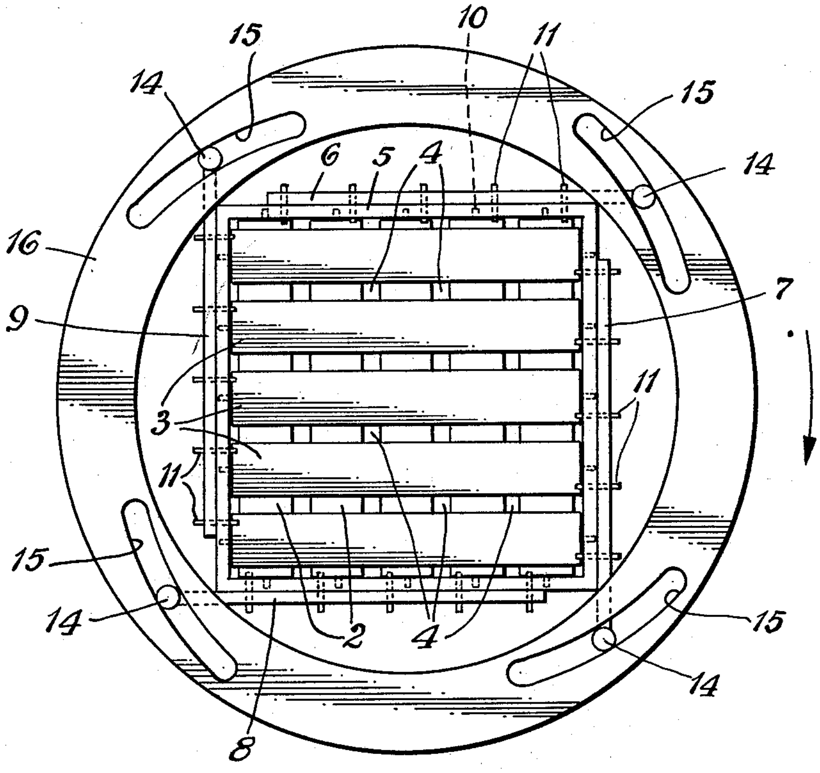
FIG. 2 is a front elevation of a construction as shown in FIG. 1.

FIG. 2 illustrates an elevation view of the two Venetian blind structures containing the slats 2 and 3 in a rectangular supporting frame 5. In the illustrated position of the slats 2 and 3 the same cover the photoelectric receiver 1 except for the small square light passage apertures 4. The slats 2 and 3 are adjusted by four control bars 6, 7, 8 and 9 of which the bars 6 and 8 operate the vertical slats 2, while the bars 7 and 9 operate the horizontal slats 3. The bars 6, 7, 8, 9 are each slidably mounted on the straight portions of the frame 5.

Figure 5:
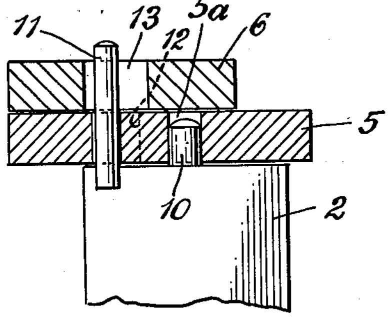
FIG. 5 illustrates the mounting and operation of the slats of the Venetian blind structure.

FIG. 5 illustrates in greater detail the mounting of the louver slats and their adjustment. Each end of the slats 2 is provided with a bearing pin 10 which is rotatably mounted in a bore **5*a* of the frame 5. A pin 11 extends parallel to the bearing pin 10 and is attached with its one end to the slat 2, while the other end of the pin 11 passes freely through an arc-shaped slot 12 in the frame 5 and projects into a slot 13 provided in the slidable control bar 6 which moves at right angles to the longitudinal direction of the slats 2. The arc-shaped slot 12 in the frame 5 is necessary in order to permit the pin 11 a free movement, since the pin 11 during the to and fro movement of the slidable bar 6 performs a circular movement about the axis of the bearing pin 10. The control bars 6, 7, 8, 9 carry on their ends which project beyond the frame 5 a pin 14 which projects into guide slots 15 provided in an adjustment ring 16 which surrounds the entire Venetian blind structure. A rotation of this adjustment ring 16 permits a change of the size of the square light passage apertures 4 as desired. These square apertures 4** may be increased in size or reduced in size.

Figure 3:
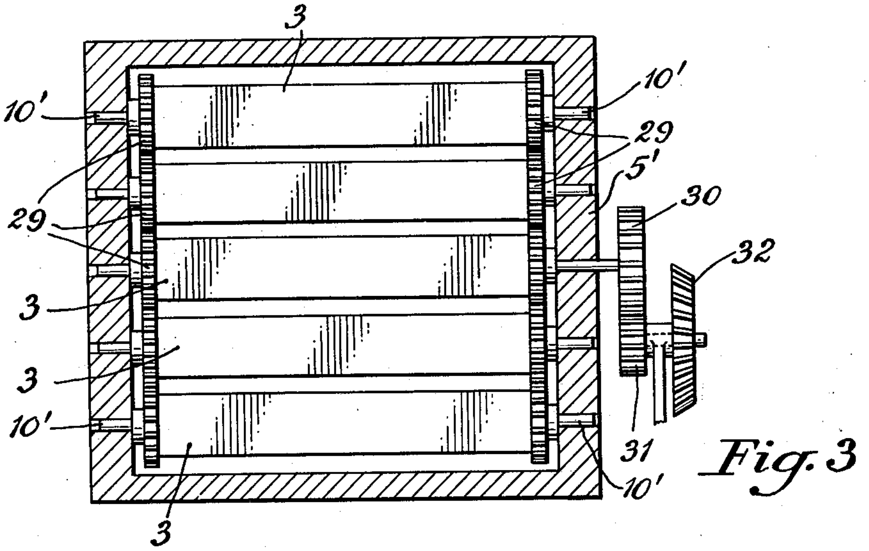
FIG. 3 illustrates a modified construction of the arrangement for adjusting the slats of the Venetian blind structure.

A modification of the adjusting device for the slats of the Venetian blind structure is illustrated in FIG. 3. In this modification the horizontal slats 3 are provided at both their ends with a gear 29 and these gears mesh with one another. The slats 3 themselves are rotatably supported in a frame 5′ by means of bearing pins 10′. For the adjusting of the slats 3 or rather the gears 29 are used elliptical gears 30 and 31 which are actuated by a manually rotatable knob 32. While the drawing shows only the horizontal slats, it should be obvious that the vertical slats 2 are adjustable in the same manner, for instance by means of a bevel gear drive which is operatively connected with the adjusting device for the horizontal slats. The elliptical gearing 30 and 31 has the purpose to adapt the movement of the slats to a scale division arranged on the manually rotatable operating knob 32. The elliptical gearing may be driven by the bevel gear 32 mating with other bevel gears not shown in the illustration.

Figure 4:
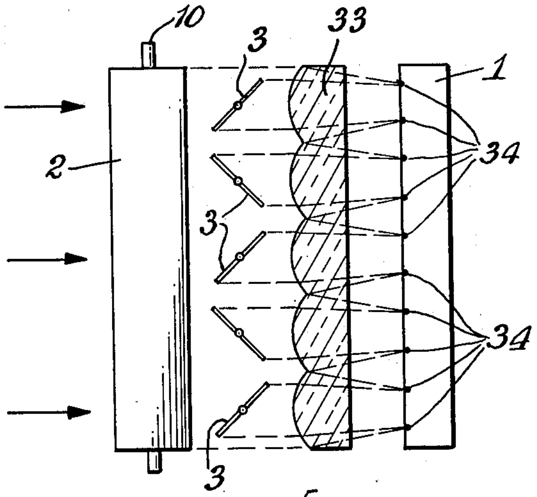
FIG. 4 illustrates diagrammatically in side elevation an embodiment of the invention in which a light diffusion plate, for instance a lens screen, is arranged between the Venetian blind structure and the photo-electric receiver.

Although the disclosed Venetian blind structure permits only an illumination of limited area portions of the photoelectric receiver when the light rays are parallel, this "island formation" on the photoelectric receiver will not cause any errors in the measurements, because the customarily applied means for limiting the picture angle for viewing the object to be photographed furnish so much diffuse light that the photoelectric surface of the receiver is sufficiently uniformly illuminated. Moreover, there is the possibility of improving the uniformity of the illumination by means of a diffusion disc if desired, in connection with a lens screen. Such an arrangement is shown in FIG. 4. The diffusion disc 33 is arranged between the two Venetian blind structures 2, 3 and the photoelectric receiver 1. The diffusion disc 33 may consist, for instance, of a frosted or grooved glass plate or plastic plate or of a glass or plastic plate coated with a dull layer. The plate is provided with a square lens screen of which the dimensions of the lenses are proportioned to the size and shape of the light passage apertures produced by the two Venetian blind structures. The elementary lenses of the lens screen have the purpose to concentrate the incoming parallel light rays into the focal lines 34 on the receiver surface. FIG. 4 discloses that there are produced twice as many focal lines as there are produced light beams. The diffusion action of the lens screen disc is preferably selected in such a manner that its central diffusion width corresponds to the distance between adjacent focal lines. In this manner it is assured that even when the light rays are parallel the photoelectric receiver surface will be uniformly illuminated.

Figure 6:
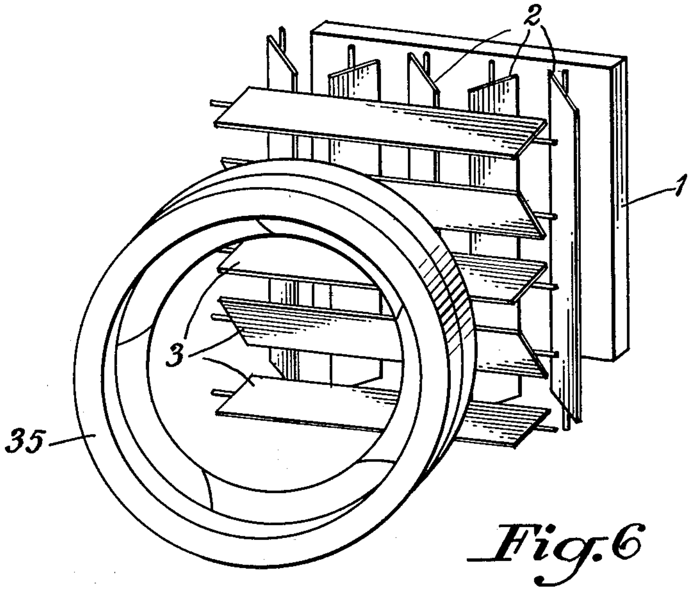
FIG. 6 illustrates the combination with iris diaphragm of the device shown in FIG. 1.

FIG. 6 illustrates the combination of the iris diaphragm 35 with a device shown in FIG. 1.

Figure 7:
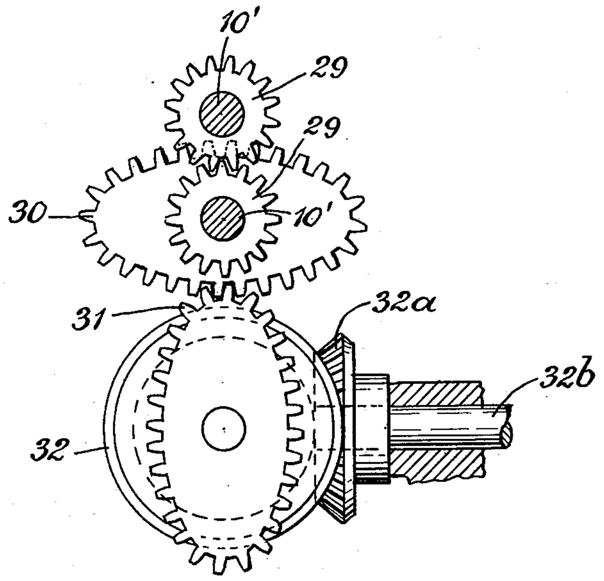
FIG. 7 illustrates details of the gear for adjusting the slats of the Venetian blind structure.

FIG. 7 illustrates the side view of the gear chain shown in FIG. 3 for operating the individual slats, where the elliptical gears 30 and 31 have been turned by 90°. 29 are the cogwheels resting on the shafts of the individual slats. 30 and 31 are the elliptical gears, where 30 rests on one of the shafts of the cogwheels 29 and 31 on the shaft of the bevel gear 32. The bevel gear 32 mates the bevel gear **32*a*. The latter is firmly connected with the driving shaft 32*b*** for operating the slats.

What I claim is:

1. A photoelectric exposure meter comprising a photoelectric receiver and two Venetian blind structures arranged consecutively and in front of said photoelectric receiver for varying the amount of light reaching said receiver, each of said Venetian blind structures including a frame and parallel extending louver slats pivotally supported in said frame, said Venetian blind structures being arranged with their slats in criss-cross intersecting relation with the slats of one structure mounted in back of the slats of the other Venetian blind structure, and means for rotatably adjusting in each one of said Venetian blind structures all of said slats therein at the same time in such a manner that adjacent slats are rotatably adjusted in opposite directions, and the width of the slots formed between said slats is progressively varied, the pivot axes of the slats in one of said Venetian blind structures being arranged to cross the pivot axes of the slats in the other one of said Venetian blind structures.

2. A photoelectric exposure meter comprising a photoelectric receiver and two Venetian blind structures arranged consecutively and in front of said photoelectric receiver for varying the amount of light reaching said receiver, each of said Venetian blind structures including a frame and parallel extending louver slats pivotally supported in said frame, the slats of one blind structure being arranged normal to and in front of the slats of the other blind structure and means for rotatably adjusting all of said slats at the same time in such a manner that adjacent slats are rotatably adjusted in opposite directions, and the width of the slots formed between said slats is progressively varied, the pivot axes of the slats in one of said Venetian blind structures being arranged to cross the pivot axes of the slats in the other one of said Venetian blind structures at right angles.

3. A photoelectric exposure meter comprising a photoelectric receiver and two Venetian blind structures arranged consecutively and in front of said photoelectric receiver for varying the amount of light reaching said receiver, each of said Venetian blind structures including a frame and parallel extending louver slats pivotally supported in said frame, the slats of one blind structure extending normal to and in front of the slats of the other blind structure in intersecting relation and means for rotatably adjusting said slats in such a manner that adjacent slats are rotatably adjusted in opposite directions, the pivot axes of the slats in one of said Venetian blind structures being arranged to cross the pivot axes of the slats in the other one of said Venetian blind structures, and a diffusion plate arranged between said two consecutively arranged Venetian blind structures and said photoelectric receiver.

4. A photoelectric exposure meter comprising a photoelectric receiver and two Venetian blind structures arranged consecutively and in front of said photoelectric receiver for varying the amount of light reaching said receiver, each of said Venetian blind structures including a frame and parallel extending louver slats pivotally supported in said frame, the slats of one blind structure extending normal to and in front of the slats of the other blind structure in intersecting relation and means for rotatably adjusting said slats in such a manner that adjacent slats are rotatably adjusted in opposite directions, the pivot axes of the slats in one of said Venetian blind structures being arranged to cross the pivot axes of the slats in the other one of said Venetian blind structures, and a lens screen plate arranged between said two consecutively arranged Venetian blind structures and said photoelectric receiver, the elementary lenses of said lens screen plate being so dimensioned and so arranged that the parallel light beams impinging upon the receiver are concentrated in twice as many focal lines as there are provided light passage apertures by said two Venetian blind structures.

5. A photoelectric exposure meter as claimed in claim 4, in which the lenses of said lens screen have a square shape and have dimensions corresponding to the dimensions of the light passage apertures formed by said two Venetian blind structures.

6. A photoelectric exposure meter according to claim 4, including a diffusion plate combined with said lens screen, the central dispersion width of which corresponds to the distance between adjacent focal lines.

7. A photoelectric exposure meter comprising a photoelectric receiver and two Venetian blind structures arranged consecutively and in front of said photoelectric receiver for varying the amount of light reaching said receiver, each of said Venetian blind structures including a frame and parallel extending louver slats pivotally supported in said frame, said Venetian blind structures being arranged with their slats in criss-cross intersecting relation with the slats of one structure mounted in back of the slats of the other Venetian blind structure, and means for rotatably adjusting all of said slats at the same time in such a manner that adjacent slats are rotatably adjusted in opposite directions, the pivot axes of the slats in one of said Venetian blind structures being arranged to cross the pivot axes of the slats in the other one of said Venetian blind structures, the slats of said Venetian blind structures being made of such a transparent material that the light penetration permitted when the Venetian blind structures are closed corresponds to the light passage permitted by the smallest aperture of an iris diaphragm in a photographic objective.

8. A photoelectric exposure meter comprising a photoelectric receiver and two Venetian blind structures arranged consecutively and in front of said photoelectric receiver for varying the amount of light reaching said receiver, each of said Venetian blind structures including a frame and parallel extending louver slats pivotally supported in said frame, said Venetian blind structures being arranged with their slats in criss-cross intersecting relation with the slats of one structure mounted in back of the slats of the other Venetian blind structure, and means for rotatably adjusting all of said slats at the same time in such a manner that adjacent slats are rotatably adjusted in opposite directions, the pivot axes of the slats in one of said Venetian blind structures being arranged to cross the pivot axes of the slats in the other one of said Venetian blind structures, and an iris diaphragm arranged between said two Venetian blind structures and said photoelectric reeciver.

9. A photoelectric exposure meter as claimed in claim 1, including bearing pins at the ends of the slats of said Venetian blind structures, a frame in which said bearing pins are rotatably supported, slat operating pins on said slats and arranged in spaced parallel relation to said bearing pins, and slidable means for actuating said operating pins, the connecting lines between said bearing pins and said operating pins forming with the direction of power actuating said operating pins an angle which in all positions of said slats is different from zero degree.

10. A photoelectric exposure meter as claimed in claim 1, including means for operatively coupling said means for rotatably adjusting said slats of said two Venetian blind structures in such a manner that the apertures formed by said two Venetian blind structures are varied substantially uniformly and continuously.

11. A photoelectric exposure meter as claimed in claim 1, including means for operatively coupling said means for rotatably adjusting said slats of said two Venetian blind structures in such a manner that the apertures formed by said two Venetian blind structures are varied substantially uniformly and continuously, said coupling means include a single rotatable coupling ring extending rotatably around said two Venetian blind structures, and means for operatively connecting said ring with said slats of both Venetian blind structures.

12. A photoelectric exposure meter as claimed in claim 1, including means for operatively coupling said means for rotatably adjusting said slats of said two Venetian blind structures in such a manner that the apertures formed by said two Venetian blind structures are varied substantially uniformly and continuously, said coupling means include a single rotatably coupling ring extending rotatably around said two Venetian blind structures, and means for operatively connecting said ring with said slats of both Venetian blind structures comprising straight and longitudinally slidable bars pivotally connected with actuating pins attached to the ends of said slats in parallel spaced relation from the pivot axes of the latter, and curved slots formed in said rotatable ring, said slots receiving pins attached at one end of said slidable bars and causing said bars to be slidably adjusted when said ring is rotatably adjusted.

13. A photoelectric exposure meter comprising a photoelectric receiver and two Venetian blind structures arranged consecutively and in front of said photoelectric receiver for varying the amount of light reaching said receiver, each of said Venetian blind structures including a frame and parallel extending louver slats pivotally supported in said frame, said Venetian blind structures being arranged with their pivoted slats in criss-cross intersecting relation with the slats of one blind structure positioned in front of the slats of the other blind structure, and means for rotatably adjusting said slats in such a manner that adjacent slats are rotatably adjusted in opposite directions, the pivot axes of the slats in one of said Venetian blind structures being arranged to cross the pivot axes of the slats in the other one of said Venetian blind structures, said means for rotatably adjusting said slats comprising gears attached to at least one end of said slats and arranged to mesh with the adjacent gears, and means forming an elliptical gearing and a bevel gearing for rotating all of said gears at the same time.

References Cited in the file of this patent

UNITED STATES PATENTS

| | | |
|---|---|---|
| 1,972,492 | Nicolson | Sept. 4, 1934 |
| 2,274,441 | Williams | Feb. 24, 1942 |
| 2,879,691 | Faulhaber | Mar. 31, 1959 |
| 2,896,508 | Biedermann | July 28, 1959 |
| 2,941,080 | Hansen | June 14, 1960 |
| 3,038,083 | Lunzer | June 5, 1962 |
| 3,045,124 | McKinlay | July 17, 1962 |
| 3,049,962 | Denecke | Aug. 21, 1962 |
| 3,060,832 | Wright et al. | Oct. 30, 1962 |

FOREIGN PATENTS

| | | |
|---|---|---|
| 847,440 | Great Britain | Sept. 7, 1960 |